US006490570B1

(12) United States Patent
Numaoka (10) Patent No.: US 6,490,570 B1
(45) Date of Patent: Dec. 3, 2002

(54) HARDWARE OR SOFTWARE ARCHITECTURE ADAPTED TO DEVELOP CONDITIONED REFLEXES

(75) Inventor: Chisato Numaoka, Paris (FR)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/141,453

(22) Filed: Aug. 27, 1998

(30) Foreign Application Priority Data

Aug. 29, 1997 (EP) .............................. 97402030

(51) Int. Cl.⁷ ................................. G06N 3/12
(52) U.S. Cl. ............................ 706/14; 706/13; 706/15
(58) Field of Search .............................. 706/14, 13, 15

(56) References Cited

U.S. PATENT DOCUMENTS 5,390,282 A  *  2/1995  Koza et al. .................... 706/13
5,880,731 A  *  3/1999  Liles et al. .................. 345/349

FOREIGN PATENT DOCUMENTS

| WO | WO 93/21586 | 10/1993 |
| WO | WO 96/37815 | 11/1996 |
| WO | WO 97/12318 | 4/1997 |

OTHER PUBLICATIONS

Jacak W. et al.: "Lifelong Learning approach to intelligent agents modeling" Computer Aided Systems Theory—Eurocast '97. Selection of Papers From the 6th Int'l Workshop on Computer Aided Systems Theory. Proceedings, Computer Aided Systems Theory—Las Palmas de Gran Canaria, Spain, Feb. 24–28, 1997, ISBN; 3–540–63811–3, 1997, Berlin, Germany, Springer–Verlag, Germany, pp. 367–379.

Maes P.: "Social interface agents: acquiring competence by learning from users and other agents" Software Agents, Papers From The 1994 AAAI Spring Symposium, Proceedings of AAAI Spring Symposium Series 1994, Stanford, CA, USA, Mar. 21–23, 1994, ISBN 0–929280–59–8, 1994, Menlo Park, CA, USA, AAAI Press, USA, pp. 71–78.

(List continued on next page.)

Primary Examiner—Wilbert L. Starks, Jr.
(74) Attorney, Agent, or Firm—Frommer Lawrence & Haug LLP; William S. Frommer; Gordon Kessler (57) ABSTRACT

An architecture, which may be embodied in hardware, software or a combination of the two, is adapted to develop reflexes conditioned based on influences external to the architecture (such as user activity) in order to optimize the fulfillment of operational requirements of application modules in the architecture. The architecture includes, in addition to one or more application modules, modulation modules involved in the regulation of the functions performed by the application modules, a central regulator for registering the existence of an unsatisfied operational requirement in an application module and for controlling the modulation modules to seek a solution by a strategy including the external indication of a "need" condition via output modules. This manifestation is detected by the architecture itself via input modules, which also detect external phenomena indicating the activity of a user or external agent. An external event or input leads to satisfaction of the operational requirement. A conditioning system receiving inputs from the application modules, modulation modules, central regulator and input and output modules generates, on the basis of conditioning received through past experience, a signal indicating the expectation of satisfaction of the operational requirement. The operation of the architecture responds to the value of this expectation signal.

12 Claims, 6 Drawing Sheets

A flowchart of an application module

OTHER PUBLICATIONS

Heidy Maldonado, Antoine Picard, Patrick Doyle and Barbara Hayes–Roth; Tigrito: a multi–mode interactive improvisational agent; Proceedings of the 1998 international conference on Intelligent user interfaces, San Francisco, CA USA, Jan. 6–9, 1998, Pa.*

Heidy Maldonado, Antoine Picard and Barbara Hayes–Roth; Tigrito: a high–affect virtual toy; Proceedings of the conference on CHI 98 summary: human factors in computing systems, Apr. 18–23, 1998, p. 367.*

John L. Moreland and David R. Nadeau; The virtual reality behavior system (VRBS): using Perl as a behavior language for VRML; Proceedings of the 1995 symposium on Virtual reality modeling language, 1995, pp. 63–68, Jan. 1998.*

* cited by examiner

FIG. 1 An inmate structure of an interactive process

FIG. 2 A mechanism to cause sympathy between two agents

FIG.3 - The Basic Architecture

FIG.4 - A flowchart of a central regulator

FIG.5 - A flowchart of a modulation module

FIG.6 - A flowchart of an application module

FIG.7 - An example of I/O modules

FIG. 8 A simple network for conditioning

FIG. 9 An example of the time variation signal

HARDWARE OR SOFTWARE ARCHITECTURE ADAPTED TO DEVELOP CONDITIONED REFLEXES

The present invention relates to an architecture, embodied either in hardware or a software agent or in a combination of hardware and software, adapted to develop reflexes and, more particularly, conditioned reflexes.

The interest of such an architecture is two-fold. Firstly, by being able to develop conditioned responses which are linked to unfulfilled operational requirements (needs), an architecture of this type can maximise the probability of satisfaction of its requirements and thus maximise its operational efficiency, for example, by increasing the duration of its useful working life. Secondly, an architecture having reflexes which are conditioned, at least in part, by externally-given user inputs, appears to the user to be exhibiting behaviour in a quasi-social manner. Such an observation leads to the experiencing by the user of a feeling of sympathy towards the machine or programme embodying the architecture. This type of sympathetic response to the architecture is something which has long been viewed as a desirable goal in the field of artificial intelligence (A.I.). One of the reasons why this goal is highly valued, is that it is generally considered that the user who feels sympathy towards a machine or software agent will better cooperate with that machine or software agent in the achievement of a common task. Moreover, the user will find working with this machine or software agent to be more congenial.

In the field of artificial intelligence, it has already been proposed to create architectures which, based on sensory inputs, can exhibit behavioural patterns which, to a human observer, appear to denote intelligence. See, for example, "A Robust Layered Control System For A Mobile Robot" by R. A. Brooks, IEEE Journal of Robotics and Automation, RA-2(1):14–23, 1986. Brooks' creatures are based on a so-called subsumption architecture and, based on a small set of primitive behaviours, without symbolic expression, they exhibit apparently very complex behaviour. Brooks' work represents an example of behaviour-based artificial intelligence.

However, in order for human user to feel sympathy towards a machine or software agent, it is not sufficient for that machine or software agent to exhibit behaviour which appears to be intelligent, it is also important that there should be an inference of emotion. This has been seen, for example, from the work of Bates ("The Role of Emotion in Believable Characters" by J. Bates, Communication of the ACM 37(7):122–125, 1994). Bates was interested in creating animated characters which would be considered to be believable by human users. His "believable" characters attracted people because they appeared to imitate human-like expressions of emotion and, thus, to show an "illusion of life". The importance of this inference of emotion in attracting or creating the sympathy of human users has also been shown by other studies such as the "Neurobaby" project ("Neurobaby" by N. Tosa in Visual Proceedings of SIGGRAPH-93 Tomorrow's Realities. ACM SIGGRAPH, 1993) and the ALIVE project ("Situation Action: A Symbolic Interpretation" by Percy Maes in Communications of the ACM 38(11): 108–114). Moreover, the degree of attachment which humans can develop for animated characters which exhibit an "illusion of life" is seen from the fact that many owners of Tamagochi™ cry when the animated character embodied therein "dies".

The present invention is based on a model which postulates that emotional expressions in humans are rooted in the experiencing of bodily needs. Although, it is clear that the needs of computers and software agents are different from those of humans, the architecture of the present invention implements an approach which metaphorically resembles that of humans when experiencing bodily needs, according to the postulated model.

More particularly, the present invention provides a system adapted to develop reflexes conditioned by experience, comprising: at least one application module having an operational requirement and adapted, when said operational requirement is not satisfied, to output a signal indicative of a need condition; a regulatory unit adapted to receive said need signal and to produce a control signal leading to a manifestation, perceptible to an external agent or user, of the existence of an unsatisfied operational requirement; input means for detecting an input or event of external origin, said input or event being adapted to cause the operational requirement of said application module to be satisfied; a conditioning unit adapted to receive signals indicative of the existence of unsatisfied operational requirements in application modules of said system, signals indicative of the manifestation perceptibly to external agents or users of the existence of the unfulfilled operational requirement, signals indicative of the detection of satisfaction inputs or events of external origin, and to generate a signal indicating the probability of satisfaction of a present unsatisfied operational requirement based on values of said received signals for previous unsatisfied operational requirements; wherein at least one unit in the system adapts its operation as a function of the value of said expectation signal.

By developing reflexes, especially reflexes conditioned by the reaction of human users or other non-human agents with which the architecture interacts, directed at the satisfaction of unsatisfied operational requirements (needs), the architecture according to the present invention optimises the chances of obtaining satisfaction of its operational requirements and exhibits a behaviour which, to a human observer, implies the existence of emotional states. This latter feature leads to a feeling of sympathy in the human user towards the machine or software agent embodying the architecture.

Other advantageous features of embodiments of the invention are recited in the dependent claims appended hereto.

Further features and advantages of the present invention will become clear from the following description of preferred embodiments thereof, given by way of example, illustrated by the accompanying drawings, in which.

Before describing in detail the architecture according to the present invention, it is first helpful to explain the model of social interactions of a sympathetic nature upon which the architecture is based.

In general, human beings are "social beings" and different theories exist regarding how this "sociability" arises. For example, according to J. Piaget, ("La Naissance de l'Intelligence Chez l'Enfant" by J. Piaget, second edition, 1948), human beings experience the process of becoming "social" during their growth. According to his theory, sociability emerges after we have developed the ability to build representations of the perceived world. It will be seen that Piaget's theory focuses on the activity of adaptation. On the other hand, according to Wallon ("Les Origines de la Pensee Chez l'Enfant", by H. Wallon, Press Universitaire de France, 1945), humans are by nature social beings. In other words, we are innately social and this affects all our interactions with the world.

Indeed, human infants cannot survive without the support of adults, despite their attempts to adapt. At a very young age, they cannot even move their arms or hands intentionally; all that they can do is to change internal states of various bodily organs, and this is generally involuntary. Wallon, therefore, believes that the primary activity of babies is to change these internal bodily states through behaviour, such as crying, which is perceived as emotional. This emotional behaviour, then, attracts adult interest and causes the adult to take care of the baby. At first, the crying may not be an indication of emotion but rather a symptom of various internal changes which take place in order to assuage a feeling of hunger. For example, to refrain from hunger it may be useful to expand the stomach so as to give a feeling that it is not empty. Such a process may cause an action designed to take in as much air as possible, namely, motions of the diaphragm and the trachea. As a result, a voice will be produced, in other words, the sound of crying. However, the baby will make a connection between its experience of hunger, the act of crying (since the baby hears itself crying), and the fact of receiving food. Thus, the baby develops a reflex to cry when it experiences hunger, as a strategy for obtaining satisfaction of its need.

Figure 1:
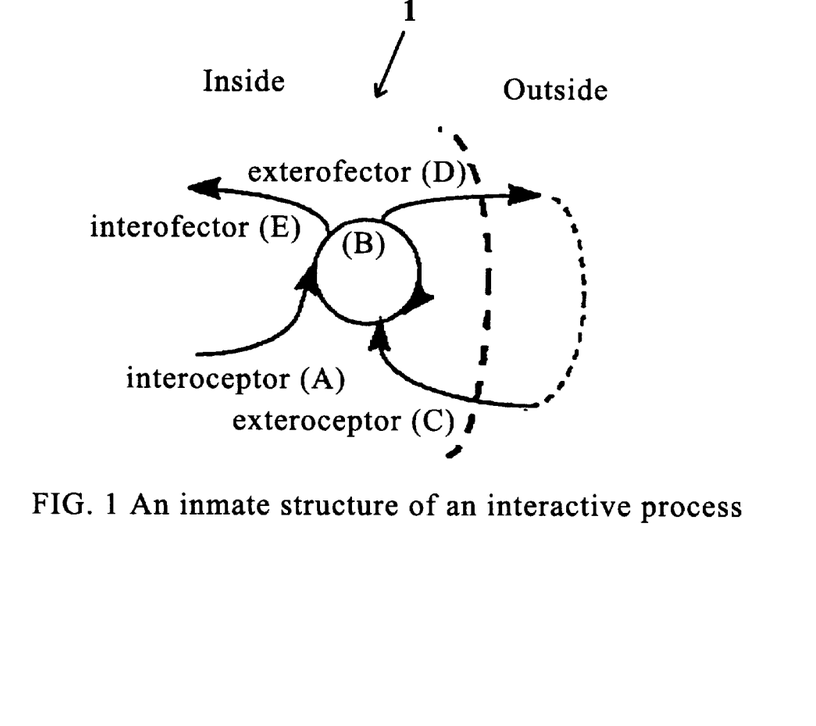
FIG. 1 is a diagram presenting the general structure of an interaction between an agent and an external entity at a time when the agent experiences a need.

A simplified model of the factors at work during the above-described conditioning process is illustrated in FIG. 1. The baby, or other agent 1 to be conditioned, experiences a need, for example hunger, as an interoceptor (A) which is registered by a regulatory system (B) which, here, is taken to be the hypothalamus (which regulates the autonomous nervous system and is generally assumed to be the central cause of emotional expressions). The regulatory system responds by generating an activity which may be internal, i.e. interofector (E) such as applying hormonal or neural regulation, and/or an external activity, i.e. exterofector (D) such as crying.

In addition the agent 1 detects the manifestation of its own internal action, that is it hears itself crying, as an exteroceptor (C) and this affects the regulatory system as a positive feedback in relation to hunger. Thus, the agent 1 is conditioned to associate the exteroceptor (C), such as the sound of crying, with a particular type of interoceptor (A), such as the experience of hunger. If the agent's need is satisfied, the conditioning will also lead to an association of a particular unsatisfied need (A) with a particular manifestation of that need (D/C) adapted to lead to satisfaction thereof. On a future occasion where this particular need (A) arises, the agent 1 will be conditioned to perform an external activity (D) (which is perceived as a manifestation (C)) in order to lead to satisfaction of its need.

It will be seen that, according to the model of FIG. 1, conditioned reflexes can be developed which are the best adapted to obtain the satisfaction to the needs of agent 1. For example, external activities (D) which do not lead to the satisfaction of the original need (A) will be abandoned and external activities which lead to satisfaction of the need will be reinforced and favoured. Thus, conditioning according to the model of FIG. 1 will enable the agent 1 to adopt strategies which are best adapted to the satisfaction of its needs (A).

However, it is conceived by the present inventors that the model of FIG. 1 can also be used as a basis for explaining how feelings of sympathy arise between two agents. Considering the diagram of FIG. 2, it will be seen that when an Agent 1 experiences an unsatisfied need (A) and generates a behaviour (D) which externally manifests the existence of this unsatisfied need, an Agent 2 which detects the manifestation of need of the Agent 1, and has experienced a conditioning similar to that of the Agent 1, will correlate this manifestation (D) which is perceived, for example, as the sound of crying, as an input (C') similar to one which this Agent 2 detected when it itself had a need similar to the need (A) of Agent 1. This input (C') may affect the regulatory system (B) of Agent 2, according to the conditioning of Agent 2, as if Agent 2 itself were experiencing the need (A).

In other words, to take a simple example, when an adult hears the voice of an infant crying for nutrition, this may automatically recall to the adult the emotional distress felt when he himself experienced hunger as a baby. Thus, the adult experiences a feeling of sympathy with the infant. This feeling of sympathy will not only lead to the satisfaction of the baby's need by the adult, but also lead to closer emotional bonds between the adult and the baby.

Figure 2:
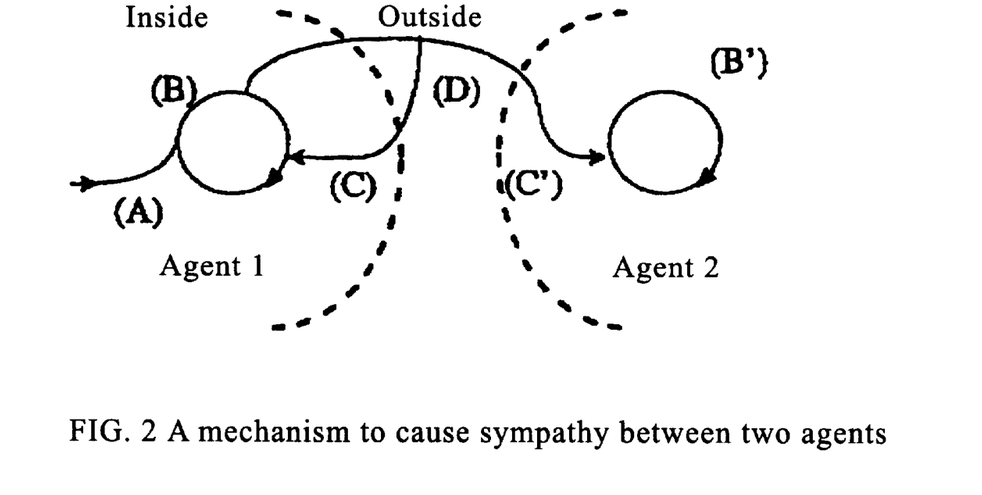
FIG. 2 is a diagram illustrating a model explaining how sympathy arises between two agents.

It is considered that the model of FIGS. 1 and 2 provides a basis for designing an architecture, to be embodied in hardware and/or software, which is adapted to develop conditioned reflexes in order to obtain satisfaction of unsatisfied operational requirements. Moreover, the architecture based on this model will generate behaviour, and interactions between the architecture and human users, of a type liable to generate sympathy between the human user and the architecture, even in cases where the architecture manifests the existence of an unsatisfied operational requirement by a behaviour which has no human or animal equivalent. Even in the latter case, the human understands that the architecture is manifesting the existence of an unsatisfied need and, since such a situation would generate distress in the human, the human user empathises, infers an emotional state in the architecture and feels sympathy.

A preferred embodiment of the architecture according to the present invention will now be described in detail referring to FIGS. 3 to 8.

Figure 3:
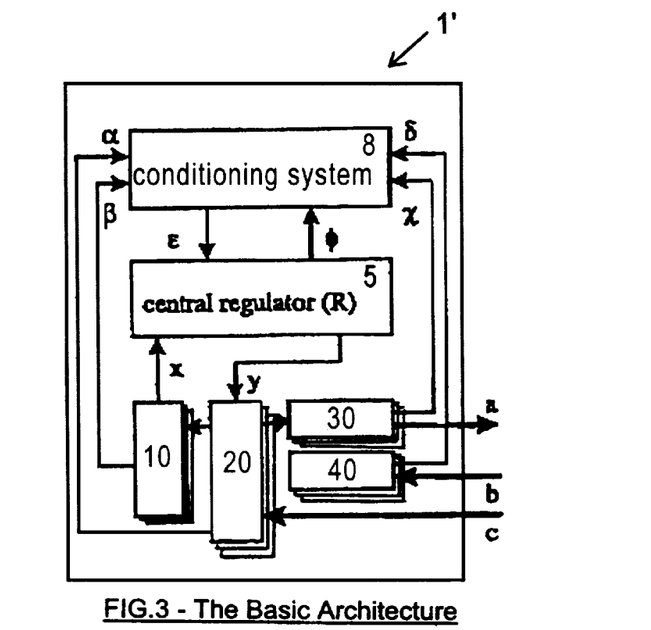
FIG. 3 is a block diagram illustrating the basic architecture for developing reflexes, according to the preferred embodiment of the present invention.

FIG. 3 is a block diagram illustrating the basic structure of the architecture. It is to be understood that the various units illustrated in FIG. 3 may be embodied partly or entirely in hardware and/or may be embodied partly or entirely in software. The architecture 1' comprises a central regulator 5 (analogous to the hypothalamus) and a conditioning system 8. The architecture 1' includes at least one application module 10 and one or more modulation modules 20 associated with the application module 10. The modulation module 20 is an intermediate module which operates to contribute to the achievement of the goal of the application module. For example, the application module 10 may be a power supply element including a voltage detector and the modulation module 20 may be regulatory system including a voltage converter. More than one modulation module 20 may play a role in association with a particular application module 10. For example, one modulation module may perform temperature regulation whereas another may perform voltage regulation for the application module. Moreover, a single modulation module 20 may play a role in association with a plurality of application modules 10.

The architecture 1' also includes one or more output units 30, adapted to generate an output a perceptible to human users or other agents outside the architecture 1', and one or more input units 40 adapted to detect the effects b of phenomena external to the architecture 1'. In addition, the modulation module 20 is adapted to detect an input or event c which is external to the architecture 1' and which is adapted to cause the resolution or satisfaction of an operational requirement of the application unit 10 (perhaps by triggering further action internal to the architecture, e.g. operations controlled by the modulation module). For example, the modulation unit 20 may have a terminal for connection to a power source external to the architecture 1' and the event c may be connection of an external power source to this terminal, the modulation module will then perform voltage conversion in order to satisfy the operational requirement of the application module.

In FIG. 3, the arrows a, b and c indicate, as mentioned above, an output from the architecture (for example sound), an input detected by the architecture (such as a sound detected in the environment), and a signal or event leading to the satisfaction of the operational requirement of the architecture, respectively. The arrows x and y, are signals which activate the respective destination modules. For example, the arrow labelled x from the application module 10 to the central regulator 5 is generated when the application module 10 has an unsatisfied operational requirement. The arrow y indicates activation signals generated by the central regulator and furnished to the modulation module(s) 20. In this embodiment, the central regulator does not know which modulation module(s) are involved in the satisfaction of the currently-unsatisfied operational requirement, thus a plurality of signals y will, in general, be emitted.

The arrows $\alpha$, $\beta$, $\gamma$ and $\chi$ are input to the conditioning system 8. The conditioning system 8 generates, on the basis of current and previous values of these inputs, a signal $\epsilon$ which represents a future expectation of satisfaction of application module 10. The signal $\alpha$ is output by a modulation module 20 and indicates whether or not the input/event c has been detected. The signal $\beta$ output from the application module 10 is an indication of satisfaction or non-satisfaction of the operational requirement of application unit 10; the signal $\epsilon$ generated by the conditioning system 8 represents a future value of $\beta$. The signal $\chi$ is output by an output unit 30 and the signal $\delta$ is output by an input unit 40. Obviously, when there are plural modulation modules 20, application modules 10, input modules 40 and output 30 modules, then these signals $\alpha$, $\beta$, $\gamma$ and $\chi$ may be multiple signals. A signal $\phi$ generated by the central regulator 5 serves to activate or inhibit the conditioning operation of conditioning system 8. In this embodiment, the conditioning system is in a conditioning mode if $\phi$ is equal to 1 and, otherwise, it represents a test model.

This architecture has the following characteristics:
the signals a and b form a pair (corresponding to the pair of signals C and D in the model of FIG. 1 ).
the architecture 1' is adapted to produce an output a which maximises the possibility of receiving a satisfactory input c. It is an important feature of this architecture that the conditioning system 8 establishes a correlation between the performance of a positive action, namely the generation of signal a, with the receiving of a satisfactory input c.
in the preferred embodiment of the invention, the conditioning system 8 inputs not only the signal ι but also the signal $\chi$. If this architecture is embodied in an agent which is isolated or which is the only agent to produce a perceptible output, then the use of these two inputs is for the purposes of redundancy only. Nevertheless, in general, the user or other agent which interacts with this architecture will generate some phenomenon (such as sound) which is perceptible by the input unit 40 as an unrecognisable signal. This leads to the ability of the architecture 1' to discriminate the existence of an unrecognisable signal (implying the presence of an external agent or user) and to correlate this with the satisfaction or non-satisfaction of the operational requirement application unit 10. If this unrecognisable signal is correlated with the receiving of an input c which satisfies an otherwise unsatisfied operational requirement of application unit 10, then this leads to the establishment of a conditioned reflex, that is the reception of an unrecognisable signal by the input module 40 will affect the value of the signal $\epsilon$ produced by the conditioning system and indicative of the expectation of satisfaction of the module 10. Thus, on reception of an unrecognisable signal at the input unit 40, the behaviour of the architecture 1' can change even before the reception of the input c necessary to satisfy the otherwise unsatisfied operational requirement of the application unit 10. For example, a modulation module can (under control of the conditioning system 8 and central regulator 5) change the nature of the output a generated by the output unit 30 or can stop generation of output a altogether.

Figure 4:
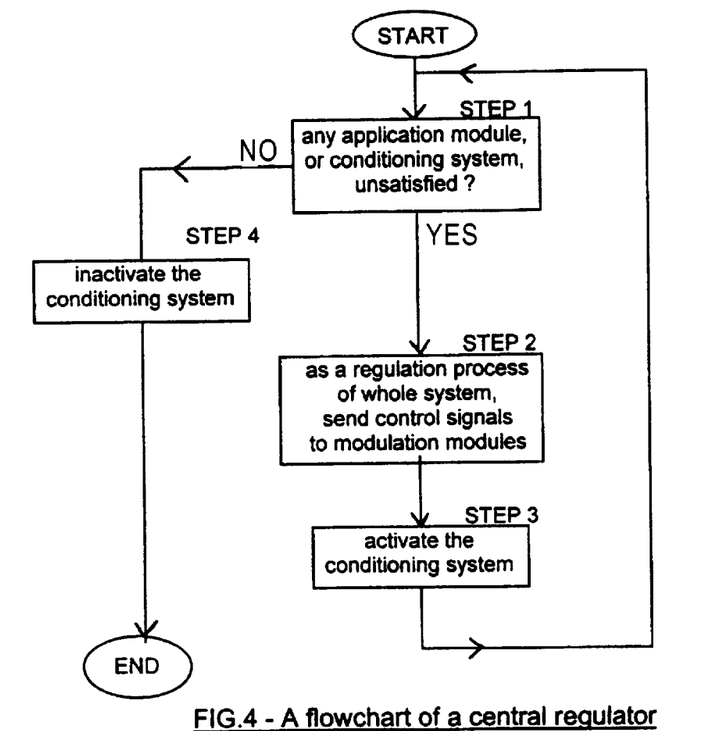
FIG. 4 is a flowchart illustrating the processes applied by a central regulator in the architecture of FIG. 3.

The operation of the central regulator 5 will now be considered in more detail with reference to FIG. 4. When the central regulator 5 receives a need signal $\chi$ from any application module, or indeed a signal from the conditioning system 8 indicative of dissatisfaction based on the values of its input signals and in view of its conditioning (step 1), the flow moves to step 2 and the central regulator 5 sends a control signal to the modulation module(s) 20. In the example of FIG. 3, this involves the sending of respective control signals y from the central regulator 5 to the modulation unit(s) 20. Next, in step 3, the central regulator 5 activates the conditioning system 8 via the signal $\phi$. The flow then returns to step 1, where it is checked whether any need signal x or signal from the conditioning system 8 is still being received. If the result of the verification in step 1 is a negative finding, then the flow moves to step 4 where the central regulator 5 ensures that the value of the signal $\phi$ sent to the conditioning system 8 has a value which will inactivate the conditioning system 8. In this way, it is ensured that the conditioning system 8 will only develop or modify its conditioning in circumstances where this is appropriate.

The modulation module(s) 20 associated with the application module 10 and the output module(s) 30 will now be described with reference to the flow chart of FIG. 5.

Figure 5:
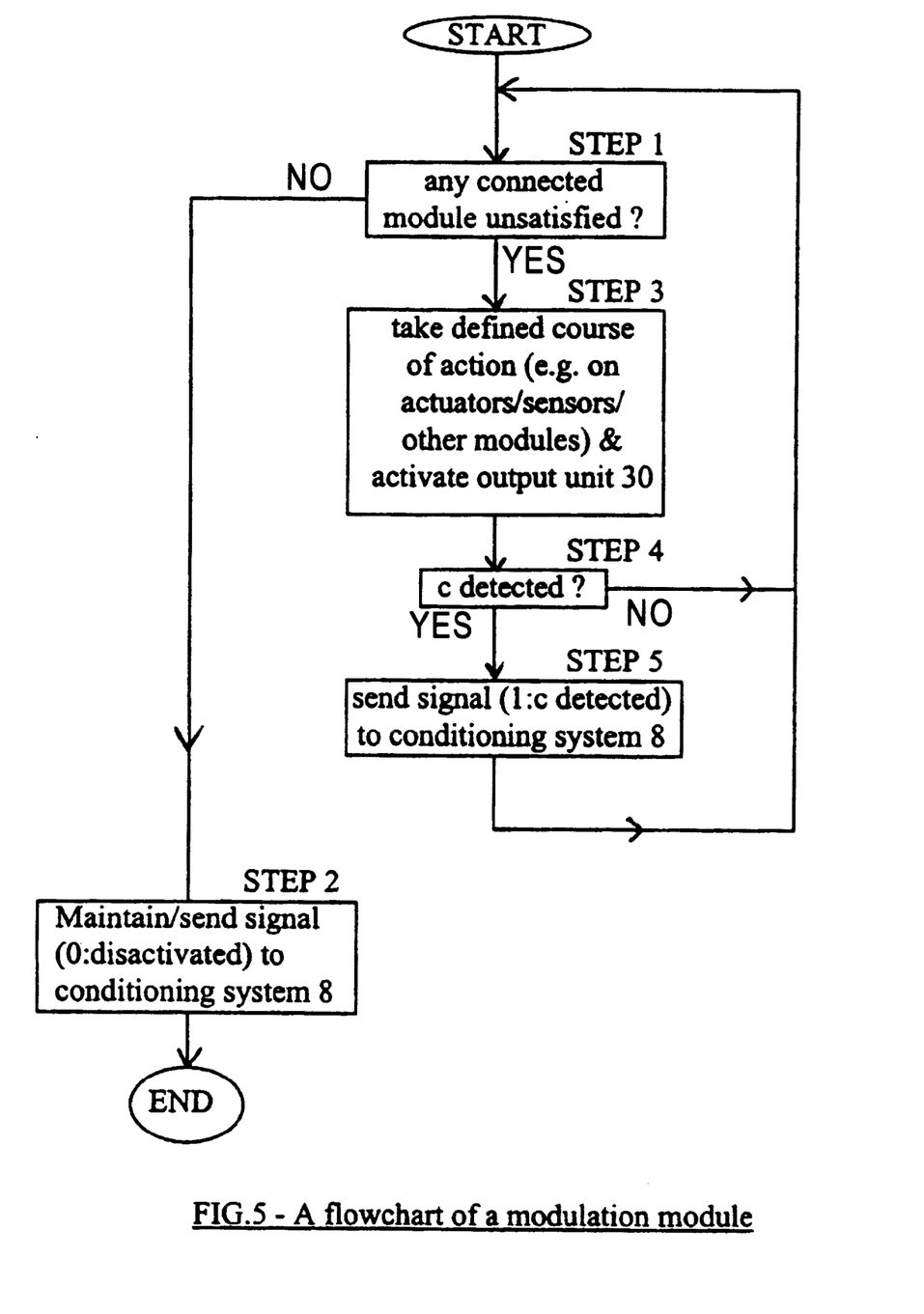
FIG. 5 is a flowchart illustrating the processes which occur in a modulation module in the architecture of FIG. 3.

When this modulation unit receives a regulation signal y from the central regulator 5, it begins operation according to the process illustrated in FIG. 5. Firstly, the modulation module 20 send enquiry signals to each module to which it is connected (which can include modulation modules as well as application modules) and notes from their responses whether any of them have dissatisfied operational requirements (step 1). If no connected module has an unsatisfied operational requirement, then the flow moves to step 2 where the modulation unit 20 assures that it is sending a signal to the conditioning unit 8 indicating that it is disactivated, the flow then ends.

If the result of the verification in step 1 is positive, then the modulation unit 20 takes remedial action (step 3) which can consist in controlling actuators, sensors or other modules, as well as sending control signals to one or more of the output units 30 such that an output a is generated. The modulation module 20 next verifies whether or not an input or event c leading to satisfaction of the operation requirement of application unit 10 has been detected (step 4). If the result of this verification is negative, then the flow returns to step 1. If the result of the verification in step 4 is positive then, if necessary, the modulation unit 20 responds to the input c by taking a defined course of action (such as activating sensors, actuators or other modules) which, in association with the input/event c will satisfy the operational requirement of application unit 10 and sends a signal α to the conditioning system 8 indicating the reception of the external input c (step 5). The flow then returns to step 1 and it is again checked whether there is any unsatisfied connected module. If there are no dissatisfied connected modules, then the flow moves to step 2 and a signal is sent to the conditioning system 8 to indicate that the modulation module 20 is now disactivated. The operation then ceases until a further input y is received from the central regulator. In this way, it is only when none of the connected modules have unsatisfied operational requirements that the modulation unit 20 sends to the conditioning unit 8 the signal indicating inactivation (step 2).

Figure 6:
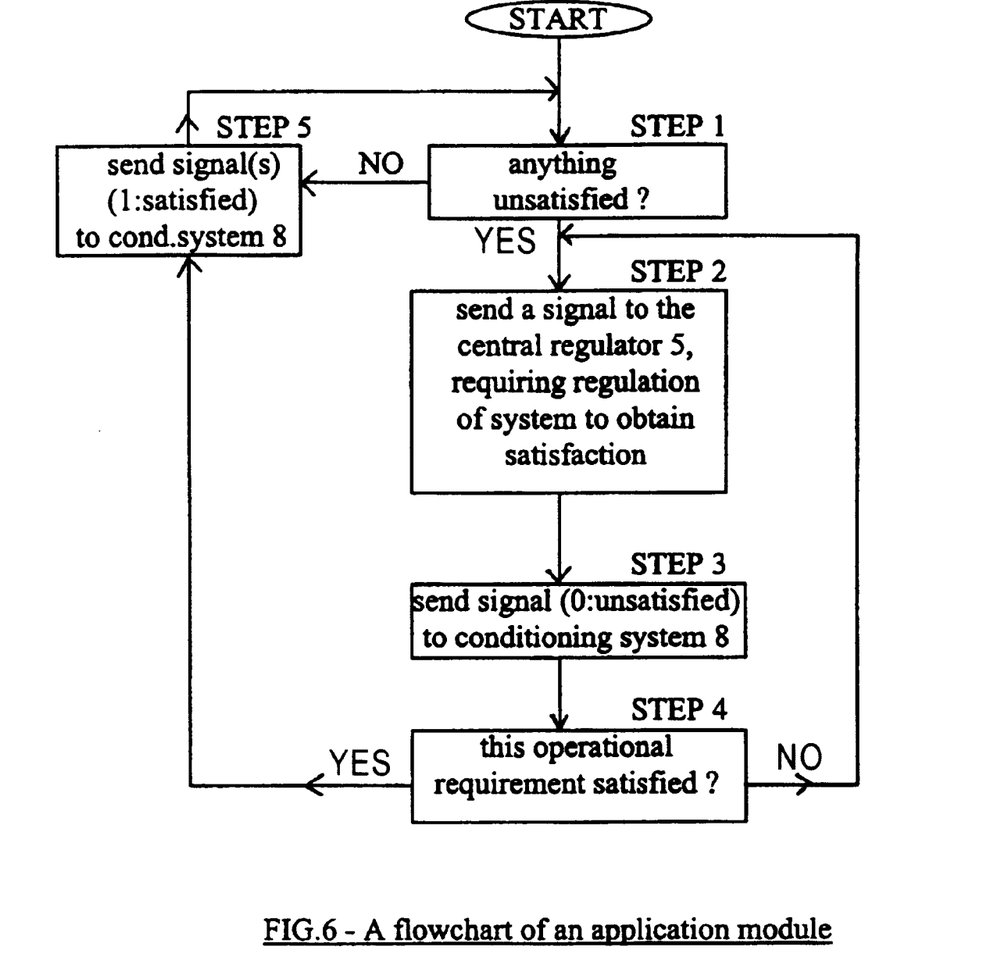
FIG. 6 is a flowchart illustrating the processes which occur in an application module in the architecture of FIG. 3.

The functioning of an application module 10 in the architecture 1' will now be described with reference to the flow chart of FIG. 6. The application module is an element which realises a function within the architecture. This unit should have at least one channel to the central regulator 5 to request regulation of the system in order to lead to satisfaction of an operational requirement of application unit 10. In addition, this application module 10 has an output β to the conditioning system 8 which, in this embodiment, takes the value 1 when the module 10 is satisfied and 0 otherwise.

When the application module 10 detects that it has an unsatisfied operational requirement (step 1 of FIG. 6) it sends a signal x to the central regulator indicating the existence of an unsatisfied operational requirement in application unit 10 which requires action in order to be resolved (step 2). If the application unit 10 has several different operational requirements, then it may indicate to the associated units which operational requirement is unsatisfied at the time in question. The application unit 10 then sends a signal β to the conditioning system 8 indicating that it has an unsatisfied operational requirement (step 3). It is now checked whether the detected unsatisfied operational requirement has been satisfied (step 4) and, if so, the flow then moves to step 5 where a signal is sent to the conditioning system to indicate that this operational requirement is now satisfied. The flow then returns to step 1. If the result of the check in step 4 is negative, then the flow returns to step 2 whereby to continue indicating to the central regulator 5 that system regulation is required.

The input and output modules 30 and 40, may be of many different types. Typically, the output module 30 generates a sound or visual output. The input modules 40, or some of them, may be complementary to the output modules 30. For example, input module 40 may be a sound detector when output unit 30 produces a sound output. In the case where at least one complementary pair of input and output modules is provided in the architecture, it can be advantageous to adopt a construction as illustrated in FIG. 7.

Figure 7:
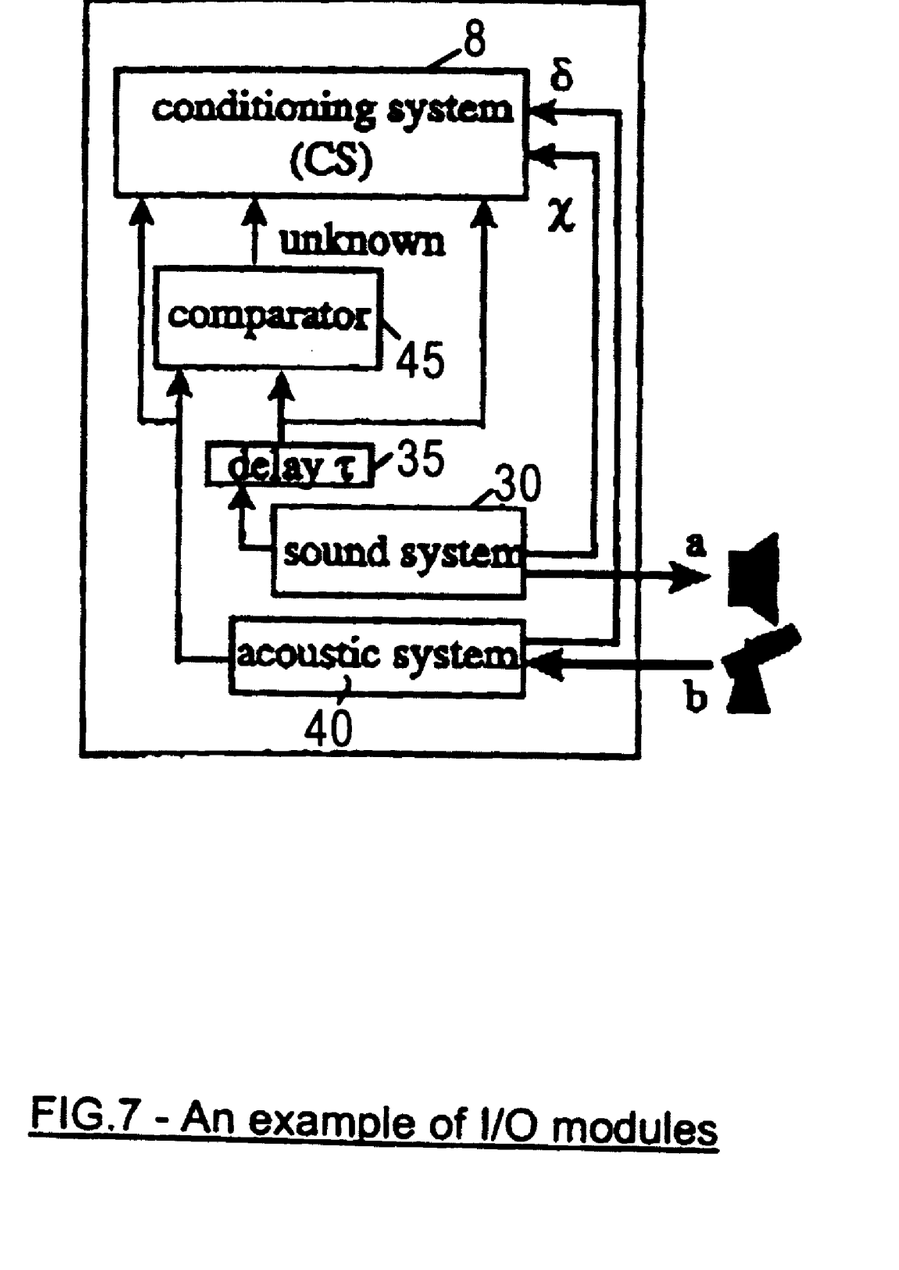
FIG. 7 is a block diagram illustrating a preferred inter-relationship between input, output and conditioning modules of the FIG. 3 architecture.

FIG. 7 illustrates a case where there is a single output unit 30, namely a sound system and loudspeaker for producing sound output, and a single input unit 40, namely a microphone and acoustic system for detecting sound. The input unit 40 will detect the sound output produced by the output unit 30 but also it will detect sounds due to external influences (e.g. a user's voice, sounds of a user moving around, etc.). It is helpful if the architecture can distinguish between the detected phenomena due to its own action and those due to external influences since this enables the architecture to detect the "help" of a user or external agent. This differentiation can be achieved using the delay 35 and comparator 45 shown in FIG. 7.

More particularly, the comparator 45 compares the detected sounds with a delayed output from the output system 30 (the delay 35 being necessary in order to compensate for time lag in production and detection of the sound issued from the loudspeaker). If the compared signals are very similar this means that the detected sound comes only from the architecture itself. However, if the comparator detects the fact that the compared inputs are completely different, then this means that there probably is detection of an external agent or user. In this case an "unknown" signal is sent to the conditioning system 8.

In more sophisticated embodiments of the present invention, the apparatus may be equipped with means for analysing the "unknown" detected input, so as to be able to differentiate between different types of external phenomena. For example, a voice recognition function could be implemented so as to enable the system to recognise the voice of a habitual user and to take different action depending upon whether or not the habitual user is recognised.

Figure 8:
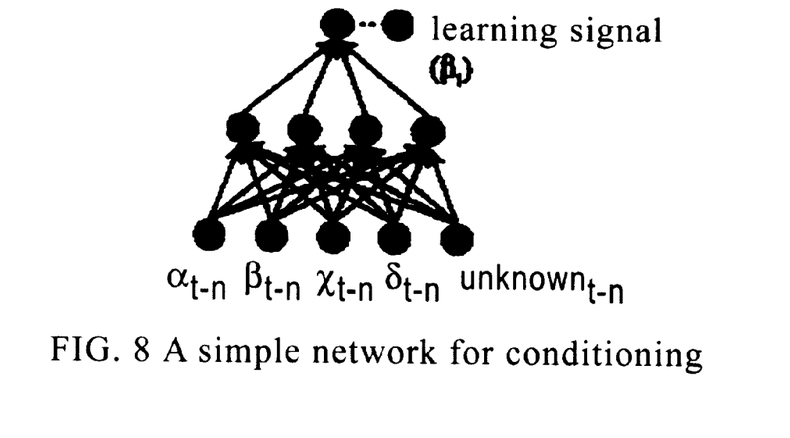
FIG. 8 is a diagram illustrating the structure of a neural network which may be used in the conditioning system of FIG. 3.

The conditioning system 8 may be implemented, for example, in a neural network. A typical example of such a neural network is illustrated in FIG. 8. It will be seen that the inputs to the neural network are the values of the signals α, β, χ, δ, and any unknown input to the input unit 40 at a time t−n, whereas the output from the neural network is a value of the expectation signal ε which represents a future value of the signal β, that is, a value for $\mu$ at a time t. An example of the time variation of typical inputs to the leaning system 8, together with values of control signals x and y, is illustrated in FIG. 9.

Figure 9:
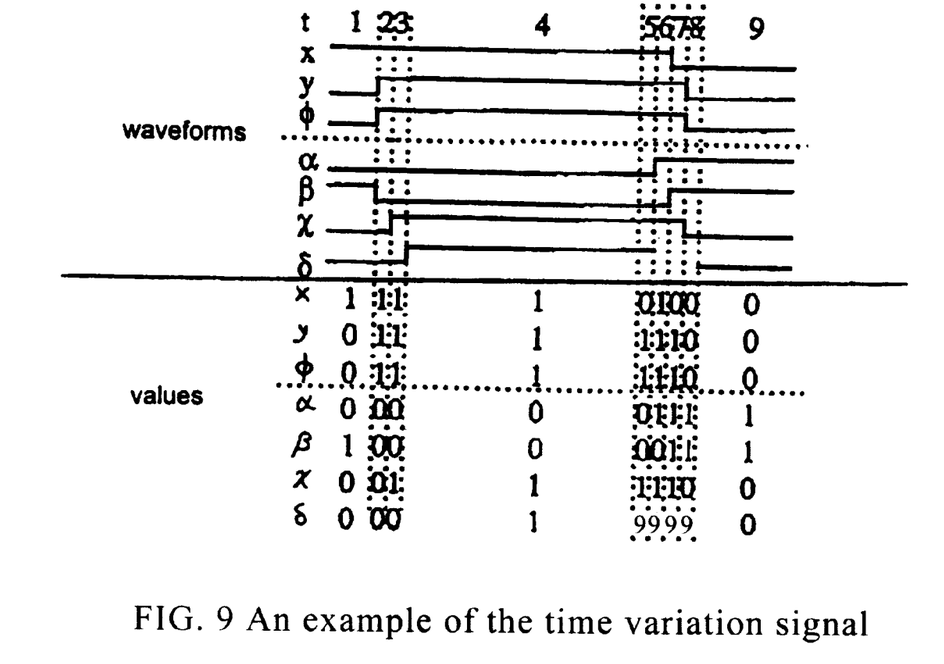
FIG. 9 is a diagram illustrating the time variation of the various inputs to the conditioning system of FIG. 3.

Considering FIG. 9 in detail, it will be seen that at a time t=1, an application module already has a need, or unsatisfied conditional requirement, which causes the application module 10 to send a signal x equals 1 to the central regulator 5. The application module 10 then, at a time t=2, sends to the conditioning system 8 a signal β=0 indicating the existence of an unsatisfied operational requirement. At the same time, the central regulator 5 outputs to the modulation module 20s respective control signals y equal to 1, adapted to activate these modules. The central regulator 5 also outputs a signal φ=1 to the conditioning system 8 in order to put the conditioning system into a conditioning mode. The modulation unit(s) 20 determines whether or not it is one of the modules connected thereto which has the unsatisfied operational requirement and, if so, outputs a signal to activate the output unit 30. The output unit 30 outputs a signal a to the exterior with the aim of attracting an input c which will resolve the unsatisfied operational requirement of application unit 10. Shortly thereafter, at a time t=3, the output unit 30 signals to the conditioning system 8 that it has produced the output a, by inputting to the conditioning system 8 a signal χ=1.

At a time t=4, the input unit 40 detects as a signal b the manifestation a output by the output unit 30 and transmits a signal δ of corresponding value to the conditioning system 8. In FIG. 9, the values of the signals χ and δ are shown as a representing 1 when the input a is output and when the b is received, respectively. However, in practice, output unit 30 and input unit 40 may supply to conditioning system 8 signals which represent more directly the actual value of the output and of the detected manifestations (volume or frequency of the detected sound, etc.).

At some later time, indicated as t=6 in FIG. 9, the modulation unit 20 detects an event or input c which will lead to the resolution of the unsatisfied operational requirement of application module unit 10. Accordingly, the signal α output from the modulation unit 20 to the conditioning system 8 changes to a value of "1" so as to indicate the reception of this input. Incidentally, this input c may be the reception of an input signal, or the detection of some activity achieved by an external agent, for example, detection of the physical connection of an external power supply to the apparatus, or the like. Also, the input c will generally be accompanied by some other perceptible phenomena, such as sounds which will be detected by the input module 40 as an unknown signal. Detection of such an unknown input signal is indicated in FIG. 9 by the value q of the signal δ which is supplied from the input unit 40 to the conditioning system 8. (As indicated above in the discussion of FIG. 7, the "unknown" signal may constitute an input to the conditioning system 5 additional to the signal δ).

When the operation requirement of the application module 10 is satisfied, at a time t=7, the signal x output from the application module 10 to the central regulator 5 changes state, as does the signal β output to the conditioning system 8, first to indicate that the operational requirement is now satisfied. As a result, at a time t=8, the central regulator 5 changes the state of the control signals y and, via the modulation module(s) 20, this leads to the ceasing of output of the signal a by the output unit 30. When the output unit 30 ceases producing the output a, the signal χ output from the output module 30 to the conditioning system 8 also changes state.

On the basis of the signals described above, the conditioning system 8 automatically becomes conditioned to associate particular values of these input signals with the satisfaction, or non-satisfaction of the operational requirement in question. Thus, the likelihood of satisfaction or non-satisfaction of the corresponding operational requirement in the future can be deduced. This enables the conditioning system 8 to develop correlations between the particular output a generated by the output unit 30 (in the case where outputs of different types are possible) and the satisfaction or non-satisfaction of a particular operational requirement. In this way, the architecture 1' can develop the strategy which is found, from experience, to best lead to satisfaction of its operational requirements.

Strictly speaking, the conditioning of the architecture 1' is possible even if we consider only the input c, and not the unknown signal q which may be received by the input unit 40. However, the ability to distinguish such an unknown input is a highly desirable feature of this architecture since it enables the architecture to detect the influence of an external user or agent and, if appropriate, to modify its behaviour when such an external agent or user is detected.

Some examples of application of the architecture according to the present invention will now be described. Experiments corresponding to these example applications have been performed in which the conditioning system was implemented using a very simple neural network producing a signal ε indicating an expectation of satisfaction. In the embodiments concerned by these experiments, the value of this expectation signal ε eventually affected the values of the regulatory signals y, as indicated below.

Jukebox Agent

There is an avatar of an agent in a virtual world which plays MIDI music. The agent wishes to continue to hear music but the switch to start playing music is not under its control. The only way to start the music is to provoke action by another, by generating a distress signal, for example a sound like the crying of a baby. When the agent has finished playing a piece of music, a list appears at a side of the avatar, which shows a selection of music. If the avatar is not in a user's view, it cannot detect a user's voice. What a user can do for the avatar is to change his/her viewpoint and to choose one piece of music on the list.

This agent has basically the same architecture as that described in FIG. 3. Its basic components are: 10) a music player, 20) a music menu manager, 30) a sound generator with a speaker system, and 40) a sound receiver with a microphone system, where the reference number corresponds to those in FIG. 3. Menu selection is done by clicking a mouse and, since this leads to playing of music, this represents an input c.

In this application, when the user comes into the vicinity of the avatar, this can be detected by the input unit 40 (by detection of the user's voice or a view of the user) as an unknown signal which is supplied to the conditioning system 8 via the signal δ. In response to the new value of the variable δ, the conditioning system 8 can, if previous experience shows this to be justified, alter the value of the expectation signal ε so as to indicate increased expectation of satisfaction. It is then preferable that the central regulator 5 should change the values of the control signals y so that the distress signal is no longer produced. This cessation of the distress signal when the user approaches the avatar, is interpreted by the user as a response to his presence in the expectation of receiving help. This will arouse feelings of sympathy in the user towards the avatar/agent.

Instead of ceasing production of the signal a upon the change in value of the expectation signal ε, the architecture can be adapted merely to inhibit generation of signal a during a period of time, T. If, at the end of period T, no satisfactory input c has been received, then the output of a is restarted. Moreover, in a development of the present invention, instead of ceasing production of the signal a upon the change of value of the expectation signal ε, the architecture may be adapted to change the nature of the output signal a. For example, the nature of the distress signal could be altered (perhaps to reduce its severity) or, instead of outputting a distress signal, the avatar could indicate what action is required on the part of the user. This changed output can also form an input to the conditioning system 8, such that the conditioning system 8 can correlate this changed input with an improvement or deterioration in the chances of satisfaction of the operational requirement.

Navigation with an Agent

Suppose that a user is navigating through a virtual world accompanied by an avatar of an agent. The agent always tries to do its best to keep following the user. When the agent is outside an area where the user is in the centre, the agent seeks to restore the situation and outputs a signal ("begins to cry"). If the user approaches and the agent again enters the area, the output signal (crying) stops.

Basic components are now: 10) a wandering system within a limited range of a circle where a user avatar is in the centre, 20) a distance tracker and calculator (it generates one when the distance between a user and this agent is in a defined range of a circle,) 30) a sound generator with a speaker system, and 40) a sound receiver with a microphone system. Input c is always the position of the user.

The architecture of the present invention may be used in many other applications, and with a large number of different variants. For example, the output means 30 may have a repertoire of different possible outputs a. Depending upon the reflexes acquired by the conditioning system 8 through experience, a particular one of this repertoire of outputs will be selected when an unresolved operational requirement arises in an application module. The choice of appropriate output a, will, of course, depend upon previous experience of which output leads to the highest expectation of satisfaction of the operational requirement. This finding may be different for different types of operational requirement. Moreover, different external inputs c may lead to different degrees of satisfaction of the operational requirement, some optimal and some sub-optimal. Again, through experience, the conditioning system 8 will be conditioned to associate different types of output a with different expectations of partial or complete satisfaction of the operational requirement. Also, the conditioning system 8 will, through experience, be conditioned to recognise which types of unknown signal received by the input module 40 are correlated with a high probability of satisfaction or non-satisfaction of the operational requirement, and can adapt behaviour of the architecture 1' accordingly.

In general, the outputs a from the architecture 1' do not have to have any relationship with expressions produced by humans. However, the probability of satisfaction of the architecture's requirements may be increased if the output resembles a distress signal of a human or animal, for example, the sound of a baby crying or a dog whining. Such expressions of distress are more likely to generate a sense of sympathy and, thus, to lead to a higher probability of positive response form the user and a closer working relationship between the user and the architecture.

Additionally, in a case where the architecture 1' includes a complementary pair of an output unit 30 and input unit 40, the architecture 1' can be capable of developing conditioned reflexes which will enable it to exhibit behaviour as if it experienced sympathy towards a user or external agent. For example, if the architecture 1' according to the present invention is embodied in a large number of identical agents, each sharing the same repertoire of output signals a, then these agents are all likely to develop the same type of conditioned reflexes. Accordingly, as explained above in relation to the model of FIG. 2, when a first agent detects at its input unit 40 the output of a signal a by a second agent, the first agent "knows" that this signal a is probably associated with a corresponding unsatisfied operational requirement within the agent 2. In some cases, the first agent may be in a position the supply the input c necessary to satisfy the operational requirement of the agent 2. However, in a case where the first agent cannot supply the input c, it can nevertheless emit an output a' in its turn which, in effect, amplifies the signal already produced by the second agent. Moreover, the output of this signal a' by the first agent "in solidarity" with the second agent will, in general, be perceived by a human user as an indication that the first agent is experiencing sympathy for the first. This, in turn, will enhance feelings of sympathy which the user may feel towards the agents.

It will be clear from the above description that the architecture according to the present invention is adapted to develop reflexes, especially reflexes conditioned by interaction with an entity external to the architecture. When the architecture is embodied in hardware, this ability can be advantageous for maintaining the apparatus in the best possible operational condition and, even, for prolonging the useful operational life thereof.

For example, if the architecture is embodied in computer apparatus and the computer apparatus is provided with application modules which include sensors for detecting conditions (e.g. smoke, high temperatures, low battery, memory saturation) which are deleterious to the components or functioning of the computer. The operational requirements of these application modules will be the existence of acceptable values for the detected parameters. Should the parameters attain unacceptable values then the architecture will adopt the strategy which it has been conditioned, through experience, to identify as the best suited to obtaining resolution of the problem.

In order to speed the flow of information from the architecture experiencing an unsatisfied operational requirement to the user, the output a can be adapted to evoke the nature of the operational requirement. For example, in a case of the detection of smoke, the output a could be the sound of a person coughing, or the output of a recorded message "smoke" or "fire".

Numerous other variations and modifications, besides those discussed above, can be made to the basic preferred embodiment described above, within the scope of the present invention as defined in the appended claims.

What is claimed is:

1. System for developing reflexes conditioned by experience, and modifying the operation of said system based upon said reflexes comprising:

at least one application module determining when an operational requirement is not satisfied, said at least one operational module outputting a signal indicative of a need condition when it is determined that said operational requirement is not satisfied;

a regulatory unit receiving said signal indicative of a need condition and producing a control signal indicating to an external agent or user the existence of an unsatisfied operational requirement;

input means for detecting an input or event from an external source, said input or event satisfying an operational requirement of said at least one application module;

a conditioning unit receiving signals indicative of the existence of unsatisfied operational requirements in one or more of said at least one application module of said system, signals indicative of the existence of the unsatisfied operational requirement, signals indicative of the detection of inputs or events satisfying an unsatisfied operational requirement, said conditioning unit generating a signal indicating the probability of satisfaction of a present unsatisfied operational requirement based on values of said received signals for previous unsatisfied operational requirements; and a detection system including one or more sensors for discriminating phenomena indicative of the activity of an agent or user external to the system, said sensors supplying to the conditioning unit a signal indicative of the discriminated phenomena, wherein the conditioning unit establishes a correlation between the signal indicative of the discriminated phenomena and the detection or non-detection of inputs or events satisfying an unsatisfied operational requirement, and modifying the signal indicating the probability of satisfaction of a present unsatisfied operational requirement in dependence upon the established correlation, wherein at least one unit in the system modifies its operation as a function of the value of said signal indicating the probability of satisfaction of said present unsatisfied operational requirement.

2. The system according to claim 1, wherein when the signal indicating the probability of satisfaction of a present unsatisfied operational requirement indicates a high degree of probability of satisfaction of the unsatisfied operational requirement, the regulatory unit changes the indication of the existence of an unsatisfied operational requirement.

3. The system according to claim 1, wherein a conditioning of the conditioning unit is selectively inhibited by an output from the regulatory unit.

4. The system according to claim 1, wherein the conditioning unit comprises a neural network.

5. The system according to claim 1, wherein upon reception of a signal indicative of a need condition the regulatory unit selects one of a plurality of different indications of the existence of the unsatisfied operational requirement, and the conditioning unit correlates the produced indication with the detection or non-detection of an input or event from an external source satisfying said unsatisfied operational requirement by the input means whereby to identify the indication which is correlated with the highest probability of satisfaction of the unsatisfied operational requirement.

6. The system according to claim 5, wherein a plurality of different inputs or events can lead to at least partial satisfaction of the unsatisfied operational requirement, and the conditioning unit correlates detected inputs or events with a corresponding detected degree of satisfaction of the unsatisfied operational requirement whereby to identify the optimal input or event which best satisfies said operational requirement, and to determine the indication which is correlated with the highest probability of detecting the optimal input or event for satisfying an unsatisfied operational requirement.

7. System for developing reflexes conditioned by experience, and modifying the operation of said system based upon said reflexes comprising:

at least one application module determining when an operational requirement is not satisfied, said at least one operational module outputting a signal indicative of a need condition when it is determined that said operational requirement is not satisfied;

a regulatory unit receiving said signal indicative of a need condition and producing a control signal indicating to an external agent or user the existence of an unsatisfied operational requirement;

input means for detecting an input or event from an external source, said input or event satisfying an operational requirement of said at least one application module;

a conditioning unit receiving signals indicative of the existence of unsatisfied operational requirements in one or more of said at least one application module of said system, signals indicative of the existence of the unsatisfied operational requirement, signals indicative of the detection of inputs or events satisfying an unsatisfied operational requirement, said conditioning unit generating a signal indicating the probability of satisfaction of a present unsatisfied operational requirement based on values of said received signals for previous unsatisfied operational requirements; and wherein upon detection by said one or more sensors of the indication of an unsatisfied operational requirement resembling an indication for which the conditioning unit has established a correlation with an unsatisfied operational requirement, at a time when said operational requirement is satisfied in the system, it is determined at the conditioning unit that the detected indication of an unsatisfied operational requirement indicates the existence of an external agent experiencing the corresponding unsatisfied operational requirement;

wherein at least one unit in the system modifies its operation as a function of the value of said signal indicating the probability of satisfaction of said present unsatisfied operational requirement.

8. The system according to claim 7, wherein upon determination by the conditioning unit that a detected indication of an unsatisfied operational requirement indicates the existence of an external agent experiencing a particular unsatisfied operational requirement, the regulatory unit generates a control signal producing a corresponding indication as if the particular unsatisfied operational requirement were being experienced by the system.

9. The system according to claim 7, wherein when the signal indicating the probability of satisfaction of a present unsatisfied operational requirement indicates a high degree of probability of satisfaction of the unsatisfied operational requirement, the regulatory unit changes the indication of the existence of an unsatisfied operational requirement.

10. The system according to claim 7, wherein upon reception of a signal indicative of a need condition the regulatory unit selects one of a plurality of different indications of the existence of the unsatisfied operational requirement, and the conditioning unit correlates the produced indication with the detection or non-detection of an input or event from an external source satisfying said unsatisfied operational requirement by the input means whereby to identify the indication which is correlated with the highest probability of satisfaction of the unsatisfied operational requirement.

11. System for eveloping reflexes conditioned by experience, and modifying the operation of said system based upon said reflexes comprising:

at least one application module determining when an operational requirement is not satisfied, said at least one operational module outputting a signal indicative of a need condition when it is determined that said operational requirement is not satisfied;

a regulatory unit receiving said signal indicative of a need condition and producing a control signal indicating to an external agent or user the existence of an unsatisfied operational requirement;

input means for detecting an input or event from an external source, said input or event satisfying an operational requirement of said at least one application module;

a conditioning unit receiving signals indicative of the existence of unsatisfied operational requirements in one or more of said at least one application module of said system, signals indicative of the existence of the unsatisfied operational requirement, signals indicative of the detection of inputs or events satisfying an unsatisfied operational requirement, said conditioning unit generating a signal indicating the probability of satisfaction of a present unsatisfied operational requirement based on values of said received signals for previous unsatisfied operational requirements; and output means for producing an audio or visual output perceptible to external agents or users in response to the control signal produced by the regulator unit;

wherein at least one unit in the system modifies its operation as a function of the value of said signal indicating the probability of satisfaction of said present unsatisfied operational requirement.

12. The system according to claim 11, wherein the output means produces an audio or visual output mimicking a human or animal expression of distress or need.

* * * * *